(12) United States Patent
Delgado et al.

(10) Patent No.: US 9,537,738 B2
(45) Date of Patent: Jan. 3, 2017

(54) REPORTING PLATFORM INFORMATION USING A SECURE AGENT

(71) Applicant: Intel Corporation, Santa Clara, CA (US)

(72) Inventors: Brian Delgado, Beaverton, OR (US); Brian S. Payne, Hillsboro, OR (US); Barry E. Huntley, Hillsboro, OR (US); Scott D. Rodgers, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 14/317,288

(22) Filed: Jun. 27, 2014

(65) Prior Publication Data

US 2015/0381442 A1 Dec. 31, 2015

(51) Int. Cl.
*H04L 29/06* (2006.01)
*H04L 12/26* (2006.01)
*G06F 9/455* (2006.01)

(52) U.S. Cl.
CPC ......... *H04L 43/065* (2013.01); *G06F 9/45558* (2013.01); *H04L 63/0807* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 9,009,820 B1* | 4/2015 | McDougal | G06F 21/56 726/22 |
| 2002/0129305 A1 | 9/2002 | Ahrens et al. | |
| 2004/0064571 A1 | 4/2004 | Nuuttila et al. | |
| 2007/0016766 A1 | 1/2007 | Richmond et al. | |
| 2008/0163209 A1 | 7/2008 | Rozas et al. | |
| 2009/0178033 A1* | 7/2009 | Challener | G06F 9/45537 717/168 |
| 2011/0219450 A1* | 9/2011 | McDougal | G06F 21/56 726/23 |
| 2011/0219451 A1* | 9/2011 | McDougal | G06F 21/562 726/23 |
| 2011/0302415 A1 | 12/2011 | Ahmad et al. | |
| 2012/0159475 A1 | 6/2012 | Abbondanzio et al. | |
| 2012/0240182 A1* | 9/2012 | Narayanaswamy | G06F 9/5077 726/1 |
| 2013/0081142 A1* | 3/2013 | McDougal | G06F 21/56 726/24 |

(Continued)

FOREIGN PATENT DOCUMENTS

CN 102014345 4/2011

OTHER PUBLICATIONS

Ahmed M. Azab, et al., "HyperSentry: Enabling Stealthy In-context Measurement of Hypervisor Integrity," 2010, 12 pages.

(Continued)

*Primary Examiner* — Christopher Revak
(74) *Attorney, Agent, or Firm* — Trop, Pruner & Hu, P.C.

(57) ABSTRACT

In an embodiment, a processor includes at least one core to execute instructions and a system management monitor to receive a platform query request from an external system, obtain status information regarding a configuration of one or more privileged resources of the processor, and report the status information to the external system. Other embodiments are described and claimed.

18 Claims, 5 Drawing Sheets

(56) References Cited

U.S. PATENT DOCUMENTS

| | | | | |
|---|---|---|---|---|
| 2013/0347131 A1* | 12/2013 | Mooring | ............ | G06F 9/45558 726/29 |
| 2014/0137180 A1* | 5/2014 | Lukacs | .................. | G06F 21/53 726/1 |
| 2014/0259171 A1* | 9/2014 | Spikes | ............... | H04L 63/1441 726/23 |
| 2014/0304819 A1* | 10/2014 | Ignatchenko | ......... | G06F 21/568 726/24 |
| 2015/0135311 A1* | 5/2015 | MacKintosh | ....... | G06F 9/45558 726/22 |
| 2015/0199532 A1* | 7/2015 | Ismael | .................. | G06F 21/552 726/30 |

OTHER PUBLICATIONS

Ahmed M. Azab, et al., "SICE: A Hardware-Level Strongly Isolated Computing Environment for x86 Multi-core Platforms," 2011, 14 pages.

International Searching Authority, "Notification of Transmittal of the International Search Report and the Written Opinion of the International Searching Authority," mailed Sep. 25, 2015 in International application No. PCT/2015/037648.

* cited by examiner

REPORTING PLATFORM INFORMATION USING A SECURE AGENT

TECHNICAL FIELD

Embodiments relate to providing platform reporting in a secure manner.

BACKGROUND

In typical computer platforms, there is no external visibility into the present state of low-level platform configuration. Additionally, a more secure and privileged environment based in system firmware is typically not used to report the platform state to an external monitor. It is further possible that malware or other attack can be triggered that causes a platform configuration change that opens up the platform to an attack. Current software antivirus programs are unable to detect such changes, and are thus ineffective at thwarting or even reporting such possible attacks.

DETAILED DESCRIPTION

In various embodiments, a privileged monitor of a monitored system may be used to receive a query from an external system and seek status information from various resources of the monitored system such as privileged system resources. In this way, a high level of security is exploited and realized, and the ability to obtain low-level resource information of a variety of system resources is supported. In turn, a report generated by the monitor may be communicated in a secure manner back to the requester, e.g., an external arbiter system. Understand that in various implementations, the privileged monitor may take many different forms, such as a dedicated virtual machine monitor (VMM), a portion thereof, a privileged agent such as an agent that executes in a system management mode (SMM), or other such agents. Of course other privileged monitors may be used in other embodiments.

Figure 1:
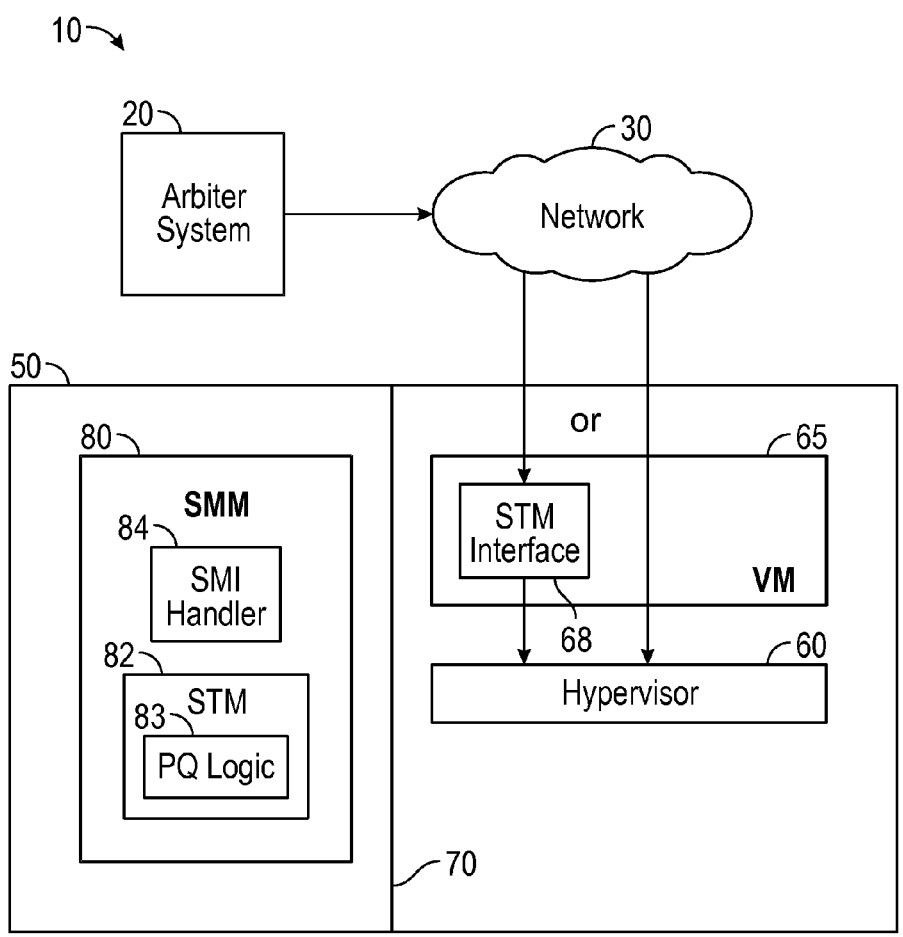
FIG. 1 is a block diagram of a portion of a system in accordance with an embodiment.

Referring now to FIG. 1, shown is a block diagram of a portion of a system in accordance with an embodiment. In the high level embodiment shown in FIG. 1, a system arrangement 10 is a network of computers including an arbiter system 20 and a remote system 50 corresponding to a monitored system. As seen, these systems interconnect via a network 30, which in an embodiment may be a public Internet. Of course in other situations a private network may connect the systems together. As one example, arbiter system 20 may be an information technology (IT) resource of an enterprise such as a backend server (including typical server components including one or more processors, memories, storage, and communication devices) and monitored system 50 may be any type of system of the enterprise, e.g., an employee's desktop computer, laptop computer, tablet computer, smartphone or any other such device. Furthermore, while one implementation is in the context of a single enterprise, understand that the arbiter system and the monitored system may be of different entities. For example, arbiter system 20 may be of a third party IT entity and monitored system 50 may be a system of a client of the IT entity. Of course many other examples are possible.

As further illustrated in FIG. 1, arbiter system 20 issues a query directed to monitored system 50. This query travels via network 30 to system 50. In an embodiment, arbiter system 20 resides on a network separate from the monitored system. In an embodiment, the platform query request may include a sequence or list of security-sensitive platform resources of monitored system 50 for which information is desired. Different manners of receiving and passing the query along to an appropriate target are possible. As illustrated, in one example a query may be provided to a system management interrupt (SMI) transfer monitor (STM) interface 68, which may be part of a virtual machine (VM) 65 that executes under a hypervisor 60 such as a VMM or other hypervisor. In other situations, the query may be sent directly to hypervisor 60. Interface 68 may be an application or a driver, in different embodiments.

In either case, the query passes through an isolation mechanism 70 to a system management mode (SMM) 80. In an embodiment, mechanism 70 may be enforced in part by a SMM range register (SMRR), which presents a barrier to cacheable reference of SMM code. Also the SMM memory region, SMRAM, is designed to be inaccessible to software execution outside of SMM 80. In an embodiment, SMM 80 may be configured as a special-purpose operating mode provided for handling system-wide functions like power management, system hardware control, or proprietary original equipment manufacturer (OEM)-designed code. The mode is typically called "hidden" as an operating system (OS) and software applications cannot see, or access it. In an embodiment, SMM 80 can be activated through a system or processor management interrupt (SMI or PMI), and may be typically associated with a protected range of memory referred to as system management random access memory (SMRAM). Access to this portion of memory is typically protected from access by a memory controller which ensures that only the correct user level priority may access the protected range of memory.

As seen in the implementation of FIG. 1, SMM 80 includes a SMI transfer monitor (STM) 82 and an SMI handler 84. STM 82 may be combinations of hardware, firmware and/or software. In one example, STM 82 may execute on a privileged portion of a processor core to execute privileged code stored in a hidden or privileged memory. In general, STM 82 may act as a sandbox or hypervisor to enable SMI handler 84 to execute as a guest or VM. Note that in contrast to VMM 60, which may be a XEN™ or other hypervisor that operates in a measured launched environment (MLE), STM 82 has full access to all processor resources, including privileged resources within SMM 80.

Although the scope of the present invention is not limited in this regard, STM 82 may access privilege resources including such privileged resources of various system hardware, processor hardware, configuration information, hidden memory and so forth. In various embodiments, STM 82 may include a platform query logic 83 configured to perform resource querying and report generation based on status information received back from such resources. Understand that while shown at this high level in the embodiment of FIG. 1, many variations and alternatives are possible. Note that in many systems, only an SMM agent such as STM 82 is able to report on certain privileged SMM resources and also has broad visibility over the rest of the host environment.

By using a platform query logic of STM 82, which resides in a highly protected region, to perform platform reporting, there are greater assurances over the ability to trust the resulting report. Still further, STM 82 may be invoked in a way that preempts the OS environment even when malware is currently executing. For performance reasons, STM 82 may be triggered with a processor thread (e.g., via a vmcall instruction) or a larger set of processor threads (multiple vmcalls or a SMI).

STM 82 may include a vmcall interface to enable receipt of the platform query request. In an embodiment, STM 82 may also set up an optional SMI interface where it inspects the type of SMI upon receipt, and determines if it is a reporting request, and may read from a predetermined memory address. In an embodiment, STM 82, via platform query logic 83, may be configured to interpret a processor's hardware configuration and capability reporting architecture, which may describe an extensible way for an arbiter system to specify various types of low-level platform configuration details. Thus responsive to receipt of a query, platform query logic 83 may interpret the query, ascertain that the request is a legitimate request (e.g., based on the arbiter's signature), and, if valid, respond with the current values for the requested items. The response flows back via hypervisor 60 (and through STM interface 68 and/or a STM interface driver, if implemented), to arbiter system 20. If arbiter system 20 determines that a discrepancy is present, it can raise an alert to an administrator or choose to allow the attack to continue so that it can be watched.

Thus, upon an indication of a platform configuration change that is not expected, arbiter system 20 may call a service that provides an alert to IT personnel (and/or a user/owner of the monitored system) regarding a transition of the monitored system into an insecure state.

Figure 2:
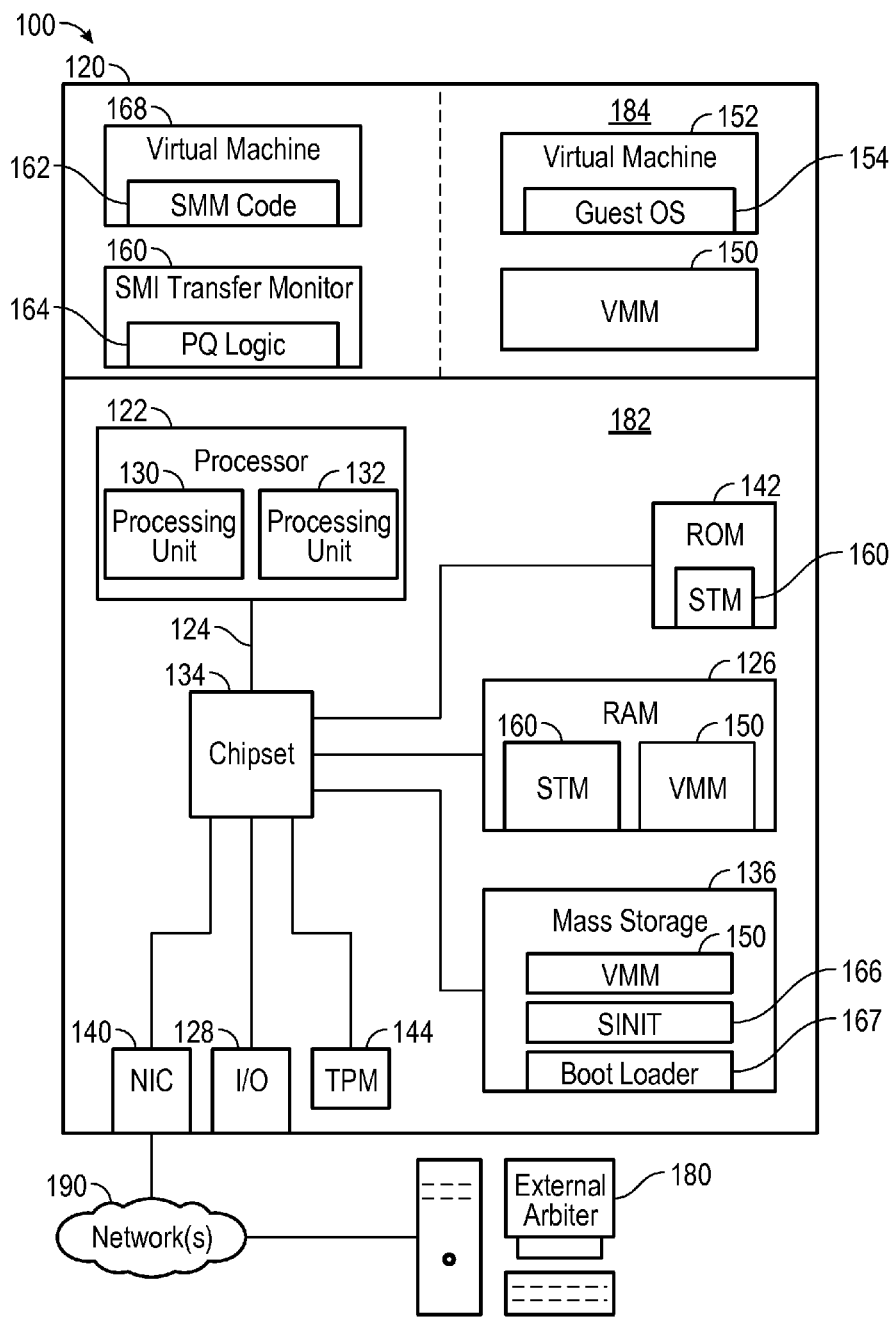
FIG. 2 is a block diagram of a data processing environment according to an example embodiment.

FIG. 2 is a block diagram of a system 100 in which embodiments may be implemented. System 100 includes a processing system 120 that has various hardware components 182, such as a processor 122 such as a central processing unit (CPU) and various other components, which may be coupled via one or more system buses 124 or other communication pathways or mediums. Processor 122 may include two or more processing units, such as processing unit 130 and processing unit 132, each of which may be a core such as a multithreaded core.

In the embodiment of FIG. 2, processor 122 is coupled to one or more volatile or non-volatile data storage devices, such as a random access memory (RAM) 126, read only memory (ROM) 142, mass storage devices 136 such as hard drives, and/or other devices or media, such as optical storage, tapes, flash memory, memory sticks, digital video disks, etc. Processor 122 may also be coupled to additional components, such as a video controller, integrated drive electronics (IDE) controllers, small computer system interface (SCSI) controllers, universal serial bus (USB) controllers, input/output (I/O) ports, input devices, output devices such as a display, etc. A chipset 134 in processing system 120 may serve to interconnect various hardware components. Chipset 134 may include one or more bridges and/or hubs, as well as other logic and storage components. In some embodiments, chipset 134 may be integrated within processor 122. In the example embodiment, processor 122 is coupled to a security processor such as a trusted platform module (TPM) 144 via chipset 134.

Processing system 120 may be controlled, at least in part, by input from conventional input devices, such as a keyboard, a mouse, etc., and/or by directives received from another machine, biometric feedback, or other input sources or signals. Processing system 120 may utilize one or more connections to one or more remote data processing systems including an external arbiter 180, such as through a network interface controller (NIC) 140, a modem, or other communication ports or coupling. Processing systems may be interconnected by way of a physical and/or logical network 190, such as a local area network (LAN), a wide area network (WAN), an intranet, the Internet, etc. Communications involving network 190 may utilize various wired and/or wireless short range or long range carriers and protocols, including radio frequency (RF), satellite, microwave, Institute of Electrical and Electronics Engineers (IEEE) 802.11, 802.16, or 802.20 protocols, Bluetooth™, optical, infrared, cable, laser, etc.

The programs in processing system 120 may be considered components of a software environment 184. The software environment 184 may include Basic Input/Output System (BIOS) components, SMM components, OS components, VMM components, user applications, etc.

As described in greater detail below, the BIOS may include an STM 160 and SMM code 162. STM 160 may include a platform query logic 164. The BIOS may progress through various phases during the boot process, and may then hand off control to VMM 150. Alternately, the BIOS may hand off control to a host OS, and the host OS may then hand off control to VMM 150. VMM 150 may then create one or more VMs 152 to support one or more guest OSs 154.

The illustrated architecture includes VMM 150, which can host one or more VMs 152. The architecture also supports STM 160, which may serve as a second peer monitor that can host one or more VMs 168 that execute in SMM. Because STM 160 executes in SMM, it is protected by the platform from tampering by VMM 150, as indicated by the dashed line separating the SMM environment from the non-SMM environment. In this architecture, STM 160 places SMM code 162 into VM 168, and constrains the access of SMM code 162 to platform resources, based upon the policy dictated by VMM 150. STM 160 also provides safe entry and exit from SMM mode caused by SMIs.

Figure 3:
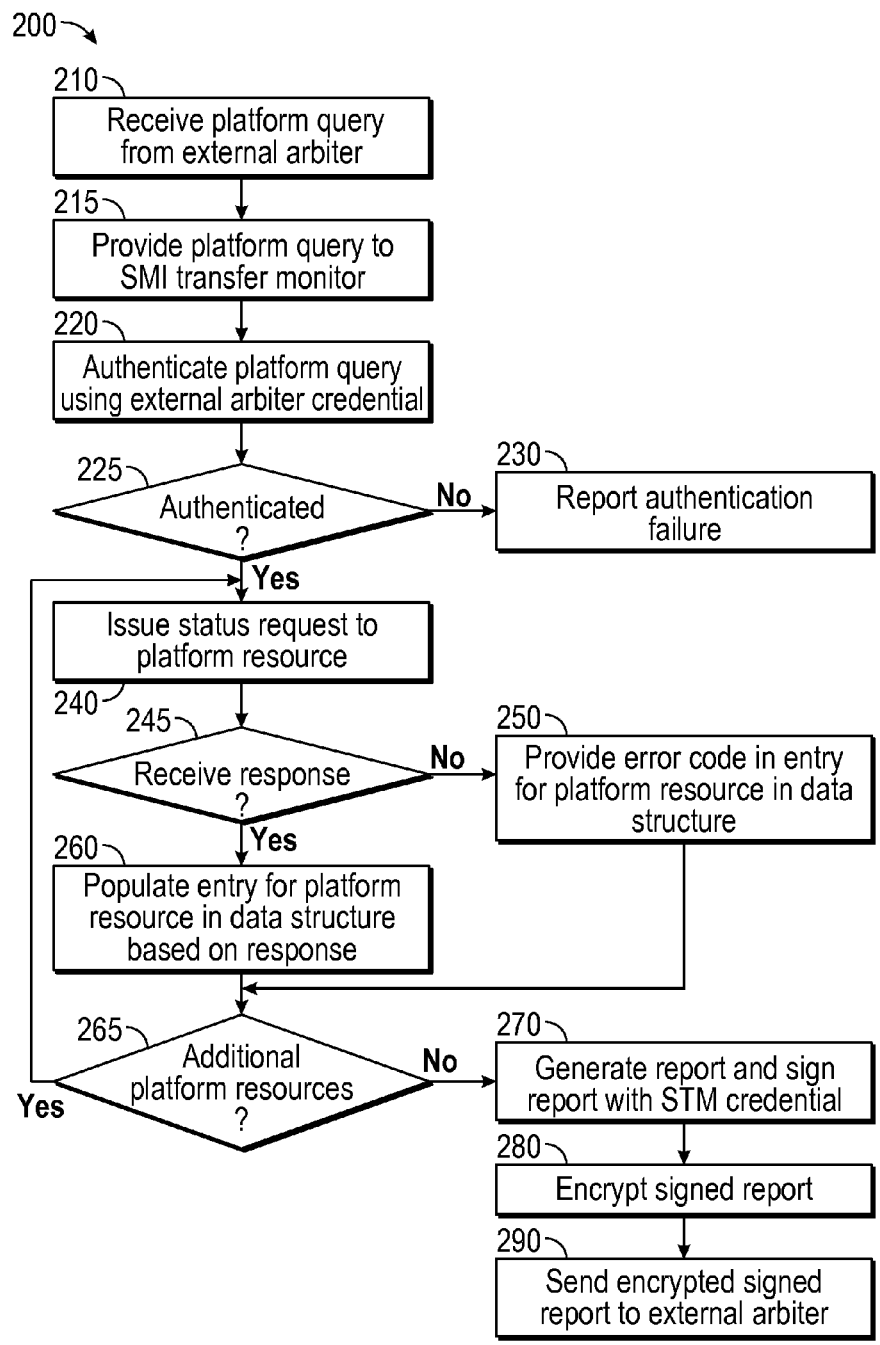
FIG. 3 is a flow diagram of a method in accordance with an embodiment of the present invention.

Referring now to FIG. 3, shown is a flow diagram of a method in accordance with an embodiment of the present invention. More specifically, method 200 of FIG. 3 may be performed by a privileged monitor of a monitored system, such as an STM. As seen, method 200 begins by receiving a platform query from an external arbiter (block 210). As example, a platform query may be received at the system from a remote external arbiter via one of various mechanisms. In an embodiment, a format of the query may be a script that contains header information and a list of platform resources for which reported information is desired. In addition the query may include a globally unique identifier (GUID) that identifies the type of script, script version number, size of the script and its sections, timestamp, session identifier, signature, and one or more platform resources to be analyzed. Example platform resources can include CPU registers, machine specific registers (MSRs), memory contents, and other platform content of interest. This platform query may be provided to an STM (block 215). There, the STM may authenticate the platform query using a credential for the external arbiter system (block 220). As an example, a credential for the external arbiter may be stored in a non-volatile protected storage of the monitored system, such as a TPM. Based on the authentication, it can be determined whether the platform query is authenticated (diamond 225). If not, an authentication failure may be reported (block 230). As example, this authentication failure may be reported to the arbiter's administrator.

Still referring to FIG. 3, if it is determined that the platform query is authenticated, control instead passes to block 240. At block 240, a status request may be issued to a given platform resource. As one example, this platform resource may be a low-level privileged resource such as a MSR. Of course many other types of platform resources, both privileged and non-privileged, may be queried as well including, for example, other registers, memory regions and so forth. Next it is determined whether a response is received, e.g., within a predetermined amount of time (diamond 245). If not, control passes to block 250 where an error code may be provided in an entry for the corresponding platform resource in a data structure. This data structure may be a buffer or other storage, from which information is obtained and a report is generated. Otherwise, upon receipt of a response, control passes to block 260 where an entry for the corresponding platform resource may be populated in the data structure based on the response. For example, a value stored in the MSR may be populated into an entry of the data structure for that MSR.

Next it is determined whether status is to be obtained from an additional platform resource (diamond 265). If so, control passes back to block 240 above. Otherwise, control passes to block 270. There, a report may be generated from the information in the data structure. Furthermore, in some embodiments the report may be signed with a credential for the STM. As example, this credential may be stored in a TPM or other non-volatile storage. Next at block 280 the signed report may be encrypted. Although the scope of the present invention is not limited in this regard, in an embodiment a public key-based encryption may be used, e.g., using a predetermined set of encryption keys. Finally, at block 290 the encrypted signed report may be sent to the external arbiter. Understand that before the report is sent, it first may be stored, e.g., in a secure memory such as a predetermined location in an SMRAM, or in a memory buffer allocated by the hypervisor. Further understand that the actual transmission of the report to the external arbiter may be performed by a VMM or other less privileged (or non-privileged) resource of the system, as the message is in an encrypted state and thus can be accessed (but not read or otherwise understood) by such non-privileged resources that are not configured to ascertain the report contents. Although shown at this high level in this FIG. 3 embodiment, understand the scope of the present invention is not limited in this regard.

Figure 4:
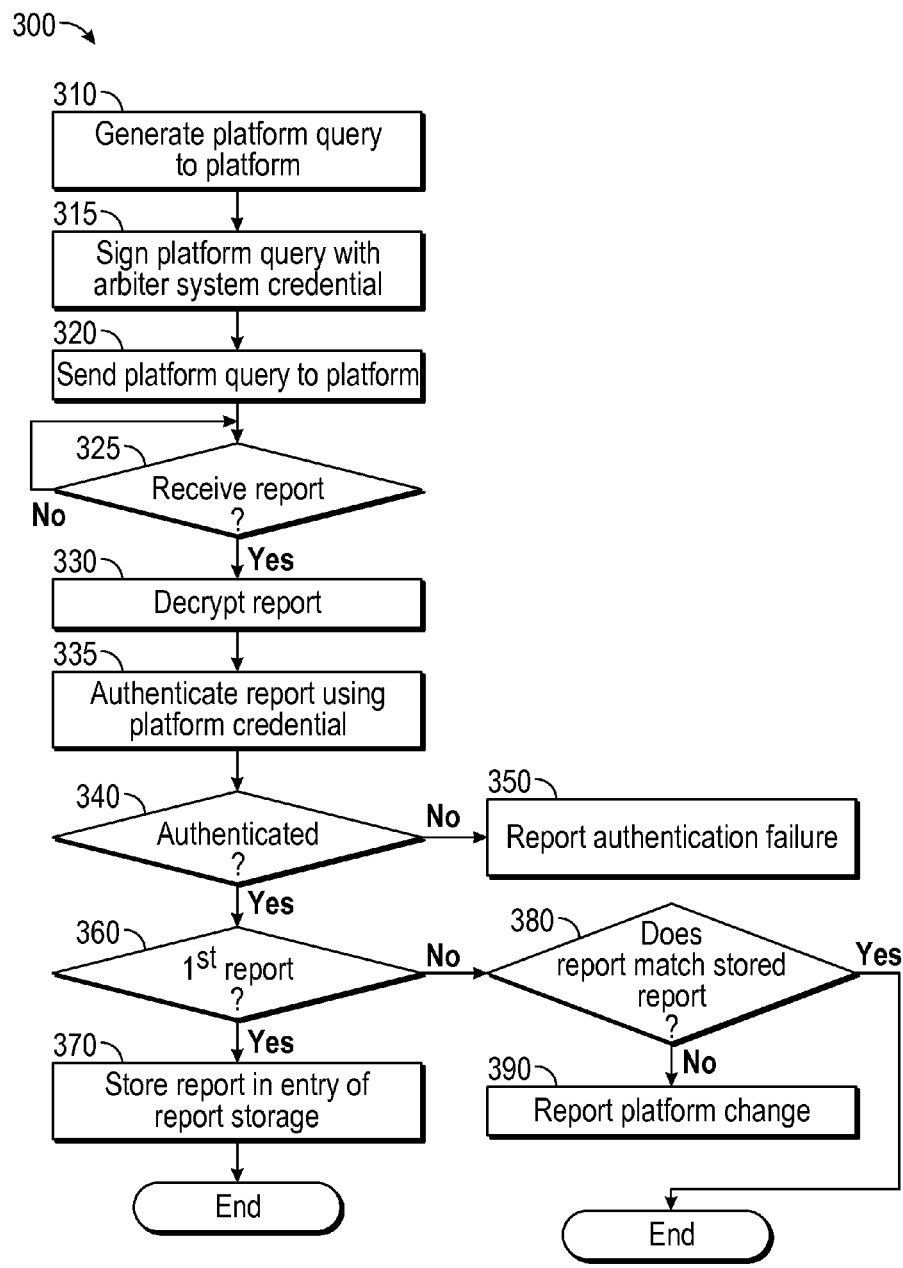
FIG. 4 is a flow diagram of a method in accordance with another embodiment.

Referring now to FIG. 4, shown is a block diagram of a method in accordance with another embodiment. More specifically, method 300 shown in FIG. 4 may be performed by an arbiter system to generate a platform query and to process the results of a platform report. As seen, method 300 begins by generating a platform query to be sent to a platform (block 310). In an embodiment, such platform query may be sent at a predetermined interval to a set of managed or monitored systems or may be generated responsive to a request, e.g., from IT personnel. As one example, the platform query may be generated including a list of status information to be requested from various platform resources, e.g., including both privileged and non-privileged resources.

After the platform query is generated, it is signed with a credential for the arbiter system (block 315). In an embodiment, the credential may be stored in a non-volatile storage, e.g., in a TPM of the arbiter system. Next, control passes to block 320 where the platform query is sent to the platform. As an example, this query can be sent via a public Internet or any other network connection. Next it is determined whether a report is received (diamond 325).

Upon receipt of the report it is decrypted (block 330). For example, the arbiter system may have decryption keys corresponding to the encryption keys used by the platform to encrypt the report. Next, the report may be authenticated. More specifically, the report may be authenticated using platform credentials of the platform (block 335). In an embodiment the platform credentials may be stored in a non-volatile storage of the arbiter system. If it is determined that the report is authenticated (diamond 340), control passes to diamond 360 to determine whether this is the first report received from the monitored platform. Note if the report is not authenticated, control passes instead to block 350 where an authentication failure may be reported. This authentication failure may be provided, e.g., to IT personnel associated with the arbiter system.

If this authenticated report is the first report from the monitored system, control passes to block 370 where the report is stored in an entry for the monitored system within a report storage, and method 300 concludes for handling of this report. Note that in some implementations this first report may be analyzed by the arbiter system to determine whether any anomalies or other items of interest exist and if so, such items may be reported, e.g., to the IT personnel.

Otherwise if the received authenticated report is not the first report from the given system, control instead passes to diamond 380 to determine whether the report matches the stored report for this monitored system. If so, no further action is taken, since the state of the platform (at least as to the requested status information) has not changed. If a mismatch is indicated, control passes to block 390 where a platform change may be reported. As an example, this platform change may be reported to the IT personnel. In addition, details regarding the change, such as changed values for one or more configuration registers or so forth also may be provided as part of the platform change report. Although shown at this high level in the embodiment of FIG. 4, the scope of the present invention is not limited in this regard.

Thus in various embodiments, platform configuration reports (including low-level platform configuration data) provided to an external system from a monitored system may originate from a SMM or another highly privileged mode.

Figure 5:
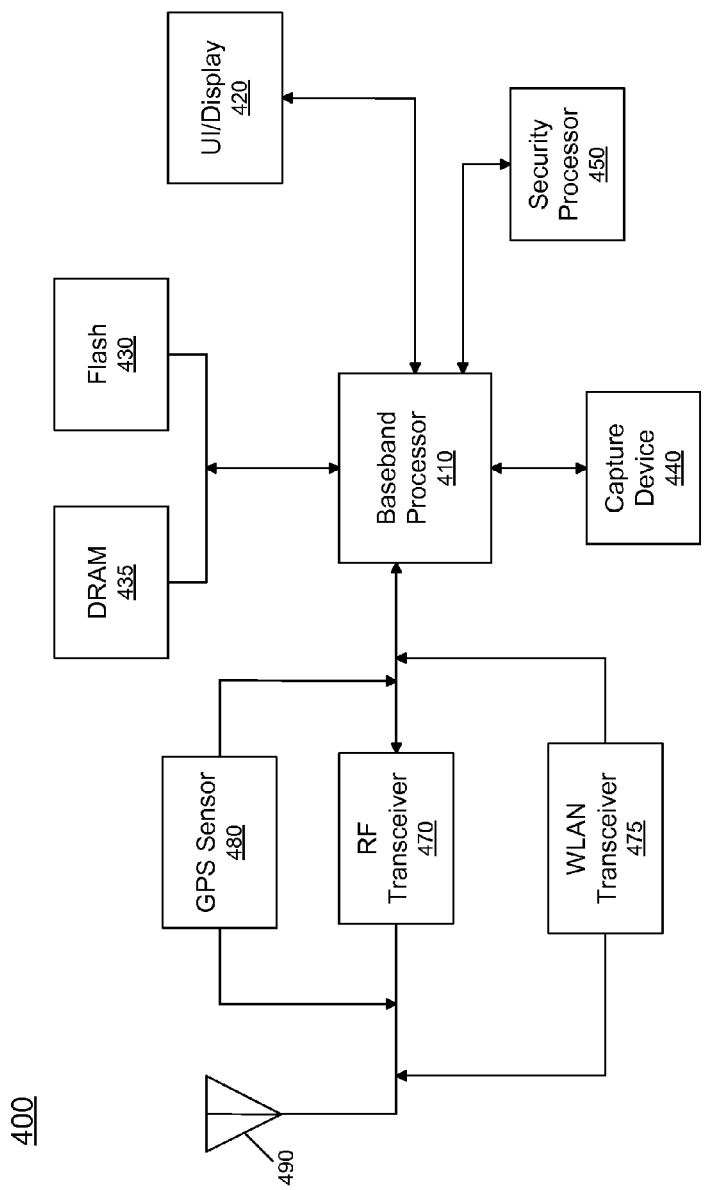
FIG. 5 is a block diagram of a system arrangement in accordance with another embodiment of the present invention.

Referring now to FIG. 5, shown is a block diagram of an example system 400 with which embodiments can be used. As seen, system 400 may be a smartphone or other wireless communicator. As shown in the block diagram of FIG. 5, system 400 may include an application or baseband processor 410. In general, baseband processor 410 can perform various signal processing with regard to communications, as well as perform computing operations for the device. In turn, baseband processor 410 can couple to a user interface/display 420 which can be realized, in some embodiments by a touch screen display. Baseband processor 410 may execute a STM as described herein to enable secure reporting of low level platform information to an external arbiter system via wireless communication, in an embodiment. In addition, baseband processor 410 may couple to a memory system including, in the embodiment of FIG. 5, a non-volatile memory, namely a flash memory 430 and a system memory, namely a dynamic random access memory (DRAM) 435, which in an embodiment may include a region of SMRAM to which access is protected via a SMRR. As further seen, baseband processor 410 can further couple to a capture device 440 such as an image capture device that can record video and/or still images.

Also included in system 400 is a security processor 450 that may couple to baseband processor 410. In the embodiment shown, security processor 450 is a separate component of the system, however understand that the various security operations performed by security processor 450 instead can be performed in baseband processor 410.

To enable communications to be transmitted and received, various circuitry may be coupled between baseband processor 410 and an antenna 490. Specifically, a radio frequency (RF) transceiver 470 and a wireless local area network (WLAN) transceiver 475 may be present. In general, RF transceiver 470 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 480 may be present. Other wireless communications such as receipt or transmission of radio signals, e.g., AM/FM and other signals may also be provided. In addition, via WLAN transceiver 475, local wireless signals, such as according to a Bluetooth™ standard or an IEEE 802.11 standard such as IEEE 802.11a/b/g/n can also be realized. Although shown at this high level in the embodiment of FIG. 5, understand the scope of the present invention is not limited in this regard.

The following examples pertain to further embodiments.

In Example 1, an apparatus comprises: a processor including at least one core to execute instructions and a system management monitor to receive a platform query request from an external system, obtain status information regarding a configuration of one or more privileged resources of the processor, and report the status information to the external system.

In Example 2, the processor of Example 1 is to execute a hypervisor to receive the platform query request and forward the platform query request to the system management monitor.

In Example 3, the apparatus of Example 2 further comprises a virtual machine interface to receive the platform query request and provide the platform query request to the hypervisor, where the virtual machine interface is to execute in a virtual machine instantiated by the hypervisor.

In Example 4, the system management monitor of Example 3 may optionally include a virtual machine call interface to receive the platform query request from the hypervisor.

In Example 5, at least one of the one or more privileged resources of Example 2 is not visible to the hypervisor.

In Example 6, the platform query request of Example 1 optionally includes an identification of the one or more privileged resources from which the external system seeks the status information.

In Example 7, the system management monitor of one or more of the above Examples is optionally to: authenticate the platform query request using a credential for the external system; issue a status request to the one or more privileged resources and, for each response received from the one or more privileged resources, populate an entry in a data structure; and generate a report using information in the data structure, sign the report with a credential of the system management monitor, and encrypt the signed report.

In Example 8, the system management monitor of Example 7 is optionally to report an authentication failure if the platform query request is not authenticated using the credential for the external system.

In Example 9, the one or more privileged resources of any of the above Examples optionally comprises a plurality of machine specific registers, at least one of the plurality of machine specific registers to store platform configuration information.

In Example 10, the system management monitor of any of the above Examples comprises a SMI transfer monitor to execute in a system management mode.

In Example 11, at least one computer readable medium includes instructions that when executed enable a system to: receive, via a network, a platform query issued by an external system in a SMI transfer monitor of the system; authenticate the platform query using a credential for the external system; if the platform query is authenticated, issue a status request to one or more privileged resources of the system and populate an entry in a data structure for each of the privileged resources based on status information reported by the corresponding privileged resource; generate a report from the data structure; and send the report to the external system.

In Example 12, the at least one computer readable medium of Example 11 further comprises instructions that when executed enable the system to sign the report with a key of the SMI transfer monitor and encrypt the signed report.

In Example 13, the at least one computer readable medium of one or more of the above Examples further comprises instructions that when executed enable the system to receive the platform query in a virtual machine interface of the SMI transfer monitor.

In Example 14, the at least one computer readable medium of Example 13 further comprises instructions that when executed enable the system to receive the platform query in the virtual machine interface of the SMI transfer monitor from a STM interface of a virtual machine instantiated by a hypervisor, where the hypervisor does not have access to at least some of the privileged resources.

In Example 15, the at least one computer readable medium of any of the above Examples further comprises instructions that when executed enable the system to populate each of a plurality of entries in the data structure with a value of a corresponding machine specific register of a processor of the system, where the corresponding machine specific register is not accessible to a hypervisor that provides the platform query to the SMI transfer monitor.

In Example 16, when the value of at least one of the corresponding machine specific registers of Example 15 is different from an original configuration of the platform, the report is to enable the external system to identify a privileged resource platform change, the privileged resource platform change inaccessible to the hypervisor.

In Example 17, a method comprises: generating a platform query request, in an arbiter system, the platform query request to request information regarding a plurality of privileged resources of a platform coupled to the arbiter system via a network, and sending the platform query request to the platform; responsive to the platform query request, receiving a report in the arbiter system from the platform, the report generated in a secure agent of the platform; and reporting, via the arbiter system, a configuration change to the platform if the report does not match a first report previously received from the platform.

In Example 18, the method of Example 17 optionally further comprises signing the platform query request with a credential of the arbiter system.

In Example 19, the method of any of the above Examples optionally further comprises authenticating the report using a credential of the platform, and if the report is not authenticated, reporting an authentication failure via the arbiter system.

In Example 20, generating the platform query request optionally comprises providing a sequence of the plurality of privileged resources, at least some of the plurality of privileged resources comprising one or more machine specific registers of a processor of the platform, where the information regarding the one or more machine specific registers comprises a current value of each of the one or more machine specific registers.

In Example 21, a system comprises: means for receiving, via a network, a platform query issued by an external system in a SMI transfer means of the system; means for authenticating the platform query using a credential for the external system; means for issuing a status request to one or more privileged resources of the system and populating an entry in a data structure for each of the privileged resources based on status information reported by the corresponding privileged resource, the means for issuing to issue the status request if the platform query is authenticated; means for generating a report from the data structure; and means for sending the report to the external system.

In Example 22, the system of Example 21 further comprises means for signing the report with a key of the SMI transfer means and encrypting the signed report.

In Example 23, the system of Example 22 further comprises means for populating each of a plurality of entries in the data structure with a value of a corresponding machine specific register of a processor means of the system, where the corresponding machine specific register is not accessible to a hypervisor means for providing the platform query to the SMI transfer means, and where the value of at least one of the corresponding machine specific registers is different from an original configuration of the system, the means for generating to enable the external system to identify a privileged resource platform change, the privileged resource platform change inaccessible to the hypervisor means.

In another Example, a computer readable medium including instructions is to perform the method of any of the above Examples. Still further, in another Example, an apparatus comprises means for performing the method of any of the above Examples.

Understand also that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a processor including at least one core to execute instructions and a system management monitor to execute on a privileged portion of the at least one core and receive a platform query request from an external system, obtain status information regarding a configuration of one or more privileged resources of the processor, and report the status information to the external system, wherein the processor is to execute a hypervisor to receive the platform query request and forward the platform query request to the system management monitor, at least one of the one or more privileged resources not visible to the hypervisor.

2. The apparatus of claim 1, further comprising a virtual machine interface to receive the platform query request and provide the platform query request to the hypervisor, the virtual machine interface to execute in a virtual machine instantiated by the hypervisor.

3. The apparatus of claim 2, wherein the system management monitor comprises a virtual machine call interface to receive the platform query request from the hypervisor.

4. The apparatus of claim 1, wherein the platform query request includes an identification of the one or more privileged resources from which the external system seeks the status information.

5. The apparatus of claim 1, wherein the system management monitor is to:
authenticate the platform query request using a credential for the external system;
issue a status request to the one or more privileged resources and, for each response received from the one or more privileged resources, populate an entry in a data structure; and
generate a report using information in the data structure, sign the report with a credential of the system management monitor, and encrypt the signed report.

6. The apparatus of claim 5, wherein the system management monitor is to report an authentication failure if the platform query request is not authenticated using the credential for the external system.

7. The apparatus of claim 1, wherein the one or more privileged resources comprises a plurality of machine specific registers, at least one of the plurality of machine specific registers to store platform configuration information.

8. The apparatus of claim 1, wherein the system management monitor comprises a system management interrupt (SMI) transfer monitor to execute in a system management mode.

9. At least one non-transitory computer readable medium including instructions that when executed enable a system to:
- receive, via a network, a platform query issued by an external system in a system management interrupt (SMI) transfer monitor of the system;
- authenticate the platform query using a credential for the external system;
- responsive to a determination that the platform query is authenticated, issue a status request from the SMI transfer monitor to one or more privileged resources of the system and populate an entry in a data structure for each of the privileged resources based on status information reported by the corresponding privileged resource;
- generate a report from the data structure; and
- send the report to the external system.

10. The at least one non-transitory computer readable medium of claim 9, further comprising instructions that when executed enable the system to sign the report with a key of the SMI transfer monitor and encrypt the signed report.

11. The at least one non-transitory computer readable medium of claim 9, further comprising instructions that when executed enable the system to receive the platform query in a virtual machine interface of the SMI transfer monitor.

12. The at least one non-transitory computer readable medium of claim 11, further comprising instructions that when executed enable the system to receive the platform query in the virtual machine interface of the SMI transfer monitor from a STM interface of a virtual machine instantiated by a hypervisor, wherein the hypervisor does not have access to at least some of the one or more privileged resources.

13. The at least one non-transitory computer readable medium of claim 9, further comprising instructions that when executed enable the system to populate each of a plurality of entries in the data structure with a value of a corresponding machine specific register of a processor of the system, wherein the corresponding machine specific register is not accessible to a hypervisor that provides the platform query to the SMI transfer monitor.

14. The at least one non-transitory computer readable medium of claim 13, wherein the value of at least one of the corresponding machine specific registers is different from an original configuration of the system, and wherein the report is to enable the external system to identify a privileged resource platform change, the privileged resource platform change inaccessible to the hypervisor.

15. A method comprising:
- generating a platform query request, in an arbiter system, the platform query request to request information regarding a plurality of privileged resources of a platform coupled to the arbiter system via a network, and sending the platform query request to the platform;
- responsive to the platform query request, receiving a report in the arbiter system from the platform, the report generated in a secure agent of the platform comprising a system management monitor to execute on a privileged portion of at least one core of the platform, wherein a hypervisor of the platform is to receive the platform query request and forward the platform query request to the system management monitor, at least one of the plurality of privileged resources not visible to the hypervisor; and
- reporting, via the arbiter system, a configuration change to the platform if the report does not match a first report previously received from the platform.

16. The method of claim 15, further comprising signing the platform query request with a credential of the arbiter system.

17. The method of claim 15, further comprising authenticating the report using a credential of the platform, and if the report is not authenticated, reporting an authentication failure via the arbiter system.

18. The method of claim 15, wherein generating the platform query request comprises providing a sequence of the plurality of privileged resources, at least some of the plurality of privileged resources comprising one or more machine specific registers of a processor of the platform, and wherein the information regarding the one or more machine specific registers comprises a current value of each of the one or more machine specific registers.

\* \* \* \* \*